US010801582B2

(12) United States Patent
Askew et al.

(10) Patent No.: US 10,801,582 B2
(45) Date of Patent: Oct. 13, 2020

(54) METHOD AND APPARATUS FOR RETAINING SHACKLES USING THIMBLE RETAINING ELEMENT

(71) Applicant: Gator Rigging, Inspection, Testing and Supply, LLC, Morgan City, LA (US)

(72) Inventors: R. Carter Askew, Morgan City, LA (US); Marty Lynn Monnin, Morgan City, LA (US)

(*) Notice: Subject to any disclaimer, the term of this patent is extended or adjusted under 35 U.S.C. 154(b) by 0 days.

(21) Appl. No.: 15/610,830

(22) Filed: Jun. 1, 2017

(65) Prior Publication Data
US 2018/0195580 A1    Jul. 12, 2018

Related U.S. Application Data

(60) Provisional application No. 62/443,268, filed on Jan. 6, 2017.

(51) Int. Cl.
F16G 11/00    (2006.01)
F16G 11/14    (2006.01)

(52) U.S. Cl.
CPC ................. *F16G 11/146* (2013.01)

(58) Field of Classification Search
CPC ................ F16G 11/12; F16G 11/146
See application file for complete search history.

(56) References Cited

U.S. PATENT DOCUMENTS

| | | | |
|---|---|---|---|
| 1,322,849 A | 11/1919 | Votaw | |
| 1,730,656 A | 10/1929 | Hilland | |
| 2,272,933 A | 2/1942 | Conohan | |
| 2,495,951 A | 1/1950 | Von Wehrden | |
| 2,558,553 A * | 6/1951 | Hansen | B66C 1/12 156/185 |
| 2,561,487 A * | 7/1951 | Bailhe | B63B 21/20 114/230.26 |
| 2,855,231 A | 10/1958 | Person | |
| 2,983,976 A * | 5/1961 | Ehmann | F16G 11/02 24/129 W |
| 3,079,192 A * | 2/1963 | Otley | B66C 1/12 24/129 B |
| 3,338,046 A * | 8/1967 | Baur | D07B 1/18 294/74 |
| 3,416,197 A * | 12/1968 | Mark | F16G 11/02 24/115 A |
| 3,527,487 A * | 9/1970 | Payne | F16G 11/02 24/122.6 |

(Continued)

*Primary Examiner* — Jason W San
(74) *Attorney, Agent, or Firm* — Ted M. Anthony

(57) ABSTRACT

A retention assembly for captivating a shackle assembly on a loop of a conventional wire rope sling assembly and preventing removal of the shackle assembly. A thimble member has first and second legs forming a loop, and at least one aligned transverse bore extending through each of the first and second legs of the thimble member. A shackle member is partially installed through the loop of the thimble member. Thereafter, a retaining member is secured within the aligned bores of the first and second leg, extending across the loop, and preventing withdrawal of the shackle member from the loop without observable damage to the shackle, thimble, retaining member , sling assembly or combinations thereof.

5 Claims, 4 Drawing Sheets

(56) References Cited

U.S. PATENT DOCUMENTS

| | | | |
|---|---|---|---|
| 4,022,507 A * | 5/1977 | Marino | B66C 1/18 |
| | | | 294/150 |
| 6,120,074 A | 9/2000 | Hamrick | |
| 8,201,309 B1 * | 6/2012 | Franta | B63B 21/04 |
| | | | 24/129 R |
| 8,256,982 B2 | 9/2012 | Lindsey | |
| 8,517,439 B2 | 8/2013 | Haun et al. | |
| 9,003,632 B2 | 4/2015 | Beall et al. | |
| D738,709 S * | 9/2015 | Moreau | D8/358 |
| 9,416,847 B2 | 8/2016 | Foley et al. | |
| D766,059 S * | 9/2016 | Moreau | D8/71 |
| 2014/0150240 A1 * | 6/2014 | Beall | F16G 11/146 |
| | | | 29/525.01 |
| 2016/0002008 A1 * | 1/2016 | Foley | B66C 1/12 |
| | | | 294/215 |
| 2016/0017911 A1 | 1/2016 | Snow et al. | |

\* cited by examiner

METHOD AND APPARATUS FOR RETAINING SHACKLES USING THIMBLE RETAINING ELEMENT

CROSS REFERENCES TO RELATED APPLICATION

Priority of U.S. Provisional Patent Application Ser. No. 62/443,268, filed Jan. 6, 2017, incorporated herein by reference, is hereby claimed.

STATEMENTS AS TO THE RIGHTS TO THE INVENTION MADE UNDER FEDERALLY SPONSORED RESEARCH AND DEVELOPMENT

None

BACKGROUND OF THE INVENTION

1. Field of the Invention

The present invention pertains to hardware for slings and other rigging. More particularly, the present invention pertains to a wire rope sling assembly having an element retaining feature. More particularly still, the present invention pertains to a thimble assembly for use with a sling assembly having a captivated shackle retaining feature.

2. Brief Description of the Prior Art

Rigging assemblies are commonly used in numerous different industrial applications including, without limitation, oil and gas well drilling, mining, and many others. In many of these applications, safety is of paramount concern because rigging equipment is used for, among other things, overhead lifting of heavy objects. Frequently, such lifting is dynamic in nature; in such cases, rigging equipment can be used to move heavy equipment using a pivoting crane or other similar lifting or hoisting apparatus.

Wire rope has many common industrial uses, such as lifting and hauling operations, towing, and tie-down applications. In many applications, wire rope is used with rigging hardware to form sling assemblies. Often, such wire rope sling assemblies include at least one loop disposed at one or both ends of a wire rope. In order to form such loops, fittings—such as clamps, clips, sockets, ferrules and/or swaged fittings—can be used to secure a loose end of said wire rope to the body of the wire rope.

Thimbles are commonly used to preserve the natural shape of loops formed with such wire rope sling assemblies. Such thimbles provide a protective surface around at least a portion—typically the inside—of each loop. Further, thimbles prevent wire rope loops from bending too tightly when loaded, and thus resist pinching and abrading of the inner surface of said wire rope loops, but typically are not load-bearing components. A shackle is often provided to connect the wire rope loop (and, thus, the attached sling assembly) to another object, such as an object to be lifted.

Applicable laws, regulations and industry standards (such as, for example DNV GL rules and standards), frequently regulate the use of industrial equipment such as slings. Such regulations generally require manufacturers to certify that parts and/or components of such equipment fully comply with applicable regulatory requirements. Rigging equipment, such as conventional wire rope sling assemblies, are typically subject to such regulatory certification requirements.

As noted above, conventional wire rope sling assemblies generally comprise multiple components such as, for example, wire rope, thimble(s), shackle(s), clamp(s) and/or other hardware. In many cases, applicable governmental regulations require manufacturers to inspect and certify each component individually. Such regulations can also generally impose limitations on the functional life of said sling assemblies and components. As such, said certified sling assemblies generally should not be modified or altered, as it could void, negate or otherwise adversely affect such certification.

Notwithstanding the foregoing, users sometimes attempt to replace or substitute sling assembly components in the field in order to extend the usable life of said sling assemblies. For example, when a shackle from one sling assembly is lost or broken, a shackle from another sling assembly can be removed and used to replace the lost or broken shackle. Aside from constituting a violation of applicable safety rules and regulations, when a weaker or otherwise inferior component is substituted or switched from one sling assembly to another, the receiving sling assembly can have a greater risk of failure.

Attempts have been made to create sling assemblies with "so-called" captivated shackles that cannot be removed from a loop of said sling assemblies without destroying—or at least severely damaging—said shackle, sling assembly or both. By preventing removal of shackles from sling assemblies, such shackles cannot be switched or interchanged between sling assemblies. However, conventional means of manufacturing captivated shackles can be time and labor intensive, significantly increasing costs associated with said goods.

For example, one type of conventional captivated shackle requires a thimble to be twisted open and significantly deformed in order to permit installation of a shackle within said thimble. Thereafter, following such installation, the thimble must then be twisted back into its original shape in order to install said thimble within the loop of a wire rope sling assembly. This process is time consuming, labor intensive, and compromises the strength and integrity of said thimble.

Thus, there is a need for a wire rope sling assembly that permits quick, efficient and safe installation of a shackle within a loop of said sling assembly (and, more particularly, a thimble to be received within said loop), while preventing said shackle from being removed without damaging or destroying said loop, thimble and/or shackle.

SUMMARY OF THE INVENTION

The present invention comprises a wire rope sling assembly having at least one captivated shackle. In a preferred embodiment, components of said sling (including, without limitation, any attached shackles) and cannot be separated without apparent damage to, or alteration of, the sling assembly and/or said associated components. Damaged or failed components of the sling assembly of the present invention cannot be removed and/or replaced without said actions being apparent upon inspection of the sling assembly and component parts thereof.

In a preferred embodiment, the present invention allows a manufacturer or other provider to obtain regulatory certification for a single wire rope sling assembly, including shackle(s) and other components, rather than being required to obtain multiple regulatory certifications for several different individual components (that must subsequently be combined or assembled in order to form a complete sling assembly). Reducing the number of regulatory certifications in this manner saves time, money and labor.

In a preferred embodiment, a sling assembly of the present invention comprises a length of wire rope having a first end and a second end, wherein a loop is formed in at least one of said first and/or second ends. Said sling assembly of the present invention further comprises a thimble member having a first leg, a second leg member, and a curved arch section there between. A thimble eye or loop is formed by cooperating inner surfaces of said first and second leg members and arch section. A peripheral groove can extend substantially along an outer surface of said first and second leg members and arch portion for receiving a wire rope loop.

A shackle retaining member extends between said first and second leg members, and generally across said thimble eye, as described more fully herein. In a preferred embodiment, said shackle retaining member further comprises a pin having a cross sectional configuration that is round, square, or other geometrical shape. Said pin can have a first end and a second end, with a head disposed on at least one of said first and/or second ends, and can be constructed of metal, alloy or other material that is of comparable strength or greater to that of said thimble member. It is also to be observed that said shackle retaining member can also have other configurations, such as a substantially planar shape.

Bores or apertures can extend through said first and second leg members of said thimble member and are generally aligned with each other. In a preferred embodiment, said bores can be drilled, molded, factory pressed or otherwise formed in said first and second legs (either during the manufacturing process or thereafter). Further, said aligned bores can be round, square or other geometric shape but, in a preferred embodiment, should substantially match the cross sectional shape of said pin. Further, said head(s) of said pin can be counter-sunk into a thimble leg such that no portion of said pin (including any head thereof) extends or protrudes into said peripheral groove, or contacts a wire rope disposed within said peripheral groove.

In a preferred embodiment, a shackle member having end lugs is threaded through said eye of said thimble member. Thereafter, said shackle retaining member is installed; said shackle retaining member forms a rigid element that extends between said first and second legs of said thimble, generally crossing through said eye of said thimble. Once installed, said shackle retaining member effectively reduces the size of the opening that said shackle lugs can pass through, thereby blocking said shackle in place and preventing said shackle from being removed from said thimble eye.

Components of the sling assembly of the present invention are beneficially sized such that said shackle cannot, once said shackle retaining member is installed, be removed from the thimble eye without damage to the shackle, thimble and/or wire rope. In this configuration (that is, with a shackle retaining member installed), said shackle retaining member (acting in cooperation with said thimble member) does not permit removal of a properly sized shackle or other rigging element simply by turning or rotating said shackle at different angles.

In a preferred embodiment, the sling assembly of the present invention can be manufactured by forming aligned bores in each of said first and second leg members of said thimble. Said aligned bores can be pressed, molded, drilled or otherwise formed, and have a slightly larger inner diameter than the outer diameter of a shackle retaining member (which is typically a pin). A shackle is looped through the eye of a shackle, and said pin is then inserted into said aligned bores in said thimble and secured in place. An end of a wire rope can be shaped to form a loop, with said loop received into a peripheral groove of said thimble. A ferrule or other device can be used to secure said thimble in place within said loop of said wire rope.

The foregoing and other objects, features, and advantages of the invention will become more apparent from the following detailed description, which proceeds with reference to the accompanying figures.

BRIEF DESCRIPTION OF DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

The present invention comprises a wire rope sling assembly having at least one captivated shackle in a retention assembly. In a preferred embodiment, components of said sling assembly (including, without limitation, any attached shackles) cannot be separated without apparent damage to, or material alteration of, the sling assembly and/or said associated components. Damaged or failed components of the sling assembly of the present invention (including, without limitation, any attached shackles) cannot be removed and/or replaced without said actions being apparent upon inspection of the sling assembly and component parts thereof.

Figure 1:
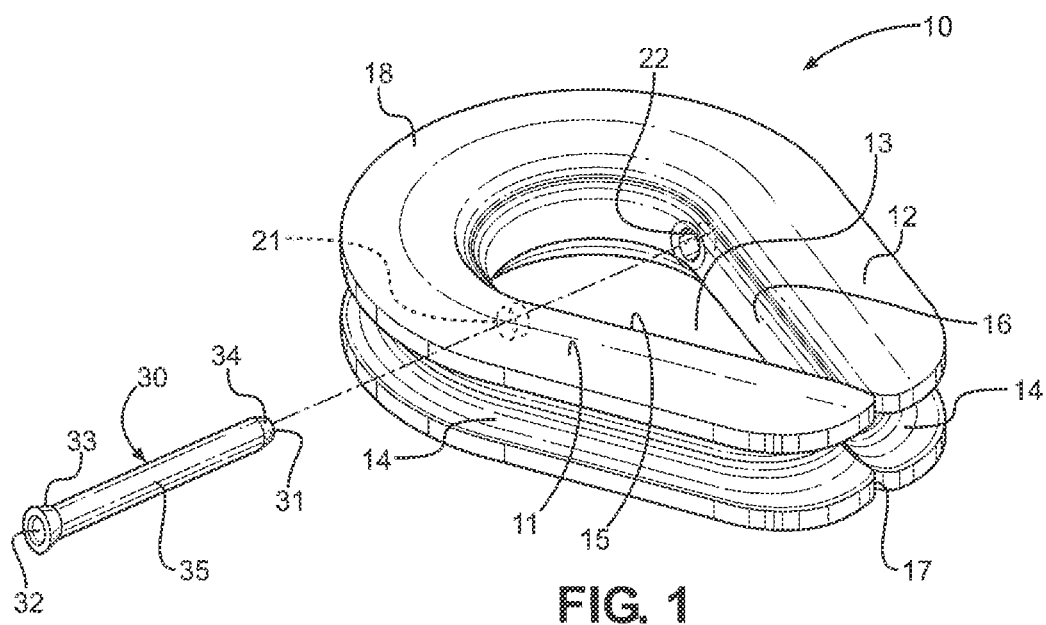
FIG. 1 depicts a perspective and partially exploded view of a thimble assembly of the present invention.

Referring to the drawings, FIG. 1 depicts a perspective and partially exploded view of a retention assembly of the present invention comprising thimble member 10. Said thimble member 10 generally comprises first leg member 11, second leg member 12, and a curved arch section or "crown" 18 between said first and second leg members. A thimble eye or loop 13 is formed by cooperating inner surfaces of said first leg member 11, second leg member 12 and crown 18. A neck or throat 17 is formed where the distal ends of first leg member 11 and second leg member 12 meet, which is generally opposite curved crown 18.

A peripheral channel 14, sometimes referred to as a "score", extends substantially along outer surfaces of first leg member 11, second leg member 12 and crown 18. In a preferred embodiment, said peripheral channel 14 defines a substantially concave and curved surface. Said peripheral channel 14 is adapted to receive a portion of a loop formed by a wire rope, and is generally sized to receive such a portion of wire rope.

First aperture or bore 21 extends through first leg member 11 in a substantially transverse orientation to said leg member 11, while second aperture or bore 22 extends through second leg member 12 in a substantially transverse orientation to said second leg member 12. Said first and second bores 21 and 22 are generally axially aligned with each other. In a preferred embodiment, said bores 21 and 22 can be drilled, molded, factory pressed or otherwise formed in said first leg member 11 and second leg member 12 (either during the manufacturing process or thereafter). Further, it is to be observed that the cross sectional profile of said axially aligned bores 21 and 22 can be round, square or other desired geometric shape.

A shackle retaining member extends between said first and second leg members 11 and 12, and generally across said thimble eye 13. In a preferred embodiment, said shackle retaining member comprises retaining pin 30; said retaining pin 30 can beneficially have a cross sectional shape that matches the cross sectional shapes of said axially aligned bores 21 and 22 (e.g., round, square, or other desired geometrical shape). Said retaining pin 30 can have a first end 31, a second end 32 and body 35. Head 33 (typically having a larger diameter than the diameter of body 35) is disposed on said second end 32, while tapered surface 34 can be formed at or near first end 31. Pin 30 can be constructed of metal, alloy or other material that is of comparable strength or greater to that of said thimble member 10.

Figure 2:
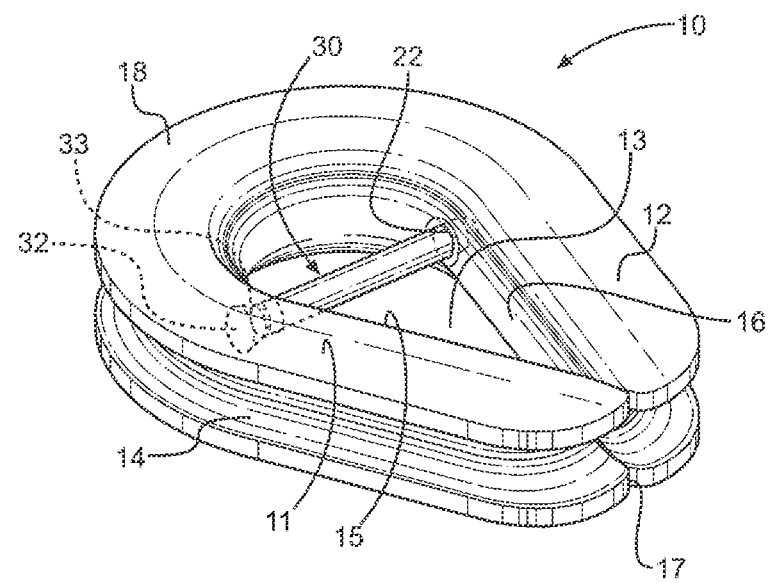
FIG. 2 depicts a perspective view of a thimble assembly of the present invention with a retaining pin installed.

FIG. 2 depicts a perspective view of a thimble member 10 of the present invention with a retaining pin 30 installed. Retaining pin 30 is received in axially aligned bores 21 and 22. Said retaining pin 30 extends between first leg member 11 and second leg member 12, and generally across thimble eye 13. In the embodiment depicted in FIG. 2, an opening of bore 21 (visible in FIG. 1, but obscured in FIG. 2) is larger enough to accommodate head 33 of said retaining pin 30, such that said head 33 is counter-sunk into said bore 21 and first leg member 11. In this configuration, no portion of said retaining pin 30 (including, without limitation, head 33) extends or protrudes into peripheral groove 14 formed in the outer surface of thimble 10.

Said thimble 10 can be constructed of any suitable material or combination of materials having desired strength and other performance characteristics. For example, in some embodiments, said thimble can comprise stainless steel, galvanized steel, extra improved plow steel, AISI 1008 steel, or combinations thereof. In some embodiments, said thimble 10 can be plated with zinc or other protective material. As depicted in the appended figures, thimble 10 is not a load-bearing device.

Retaining pin 30 can be constructed of any metal or alloy that is of comparable strength or greater as that of the material used to construct thimble 10. Further, it is to be observed that said retaining pin 30 can have a different shape along the length of body 35 of said pin (such as, for example, a curved section) or can include outwardly extending protrusions, in order to fill some portion of the space formed by said thimble eye 13.

Figure 3A:
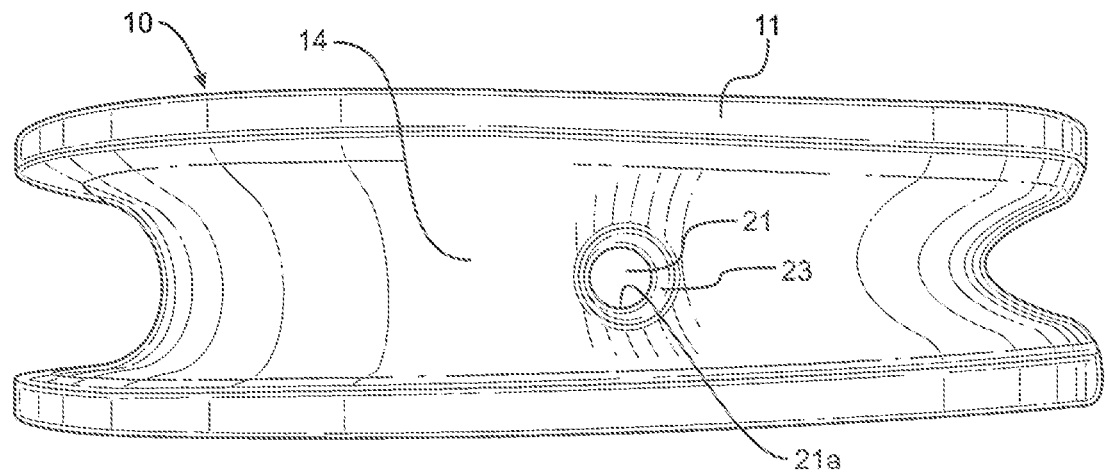
FIG. 3A depicts a side view of a thimble assembly of the present invention with a retaining pin removed.

FIG. 3A depicts a side view a thimble 10 of the present invention with retaining pin 30 removed. First aperture or bore 21 extends through first leg member 11 in a substantially transverse orientation to said leg member 11. As depicted in FIG. 3A, bore 21 defines inner surface 21a; however, opening section 23, which leads into bore 21, has a larger diameter than the diameter of inner surface 21a of bore 21. Opening section 23 beneficially has a large enough diameter to accommodate head 33 of retaining pin 30 (seen in FIG. 1, but not depicted in FIG. 3A). When retaining pin 30 is installed within bore 21, said head 33 is counter-sunk into said opening section 23 of bore 21 and first leg member 11, such that no portion of said retaining pin 30 (including, without limitation, head 33) extends or protrudes into peripheral recessed channel 14 that extends along the outer peripheral surface of thimble 10.

Figure 3B:
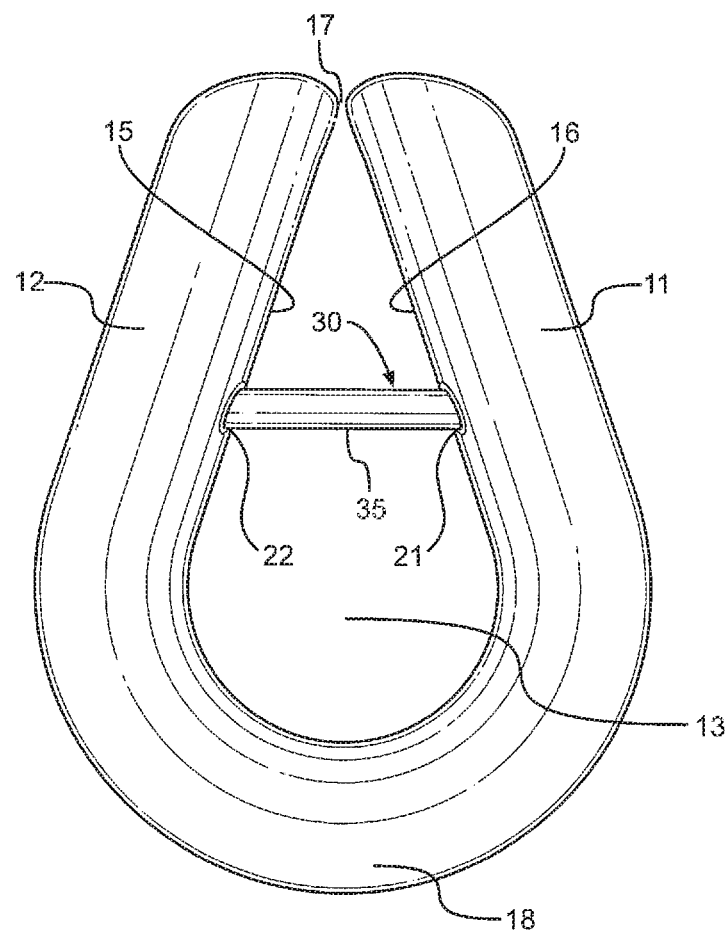
FIG. 3B depicts a side view of a thimble assembly of the present invention with a retaining pin installed.

FIG. 3B depicts a side view of a thimble member 10 of the present invention with a retaining pin 30 installed. Said retaining pin 30 extends between first leg member 11 and second leg member 12 in an orientation that is generally transverse to said first leg member 11 and second leg member 12. Said retaining pin 30 generally crosses the space or gap formed by thimble eye 13.

Figure 4:
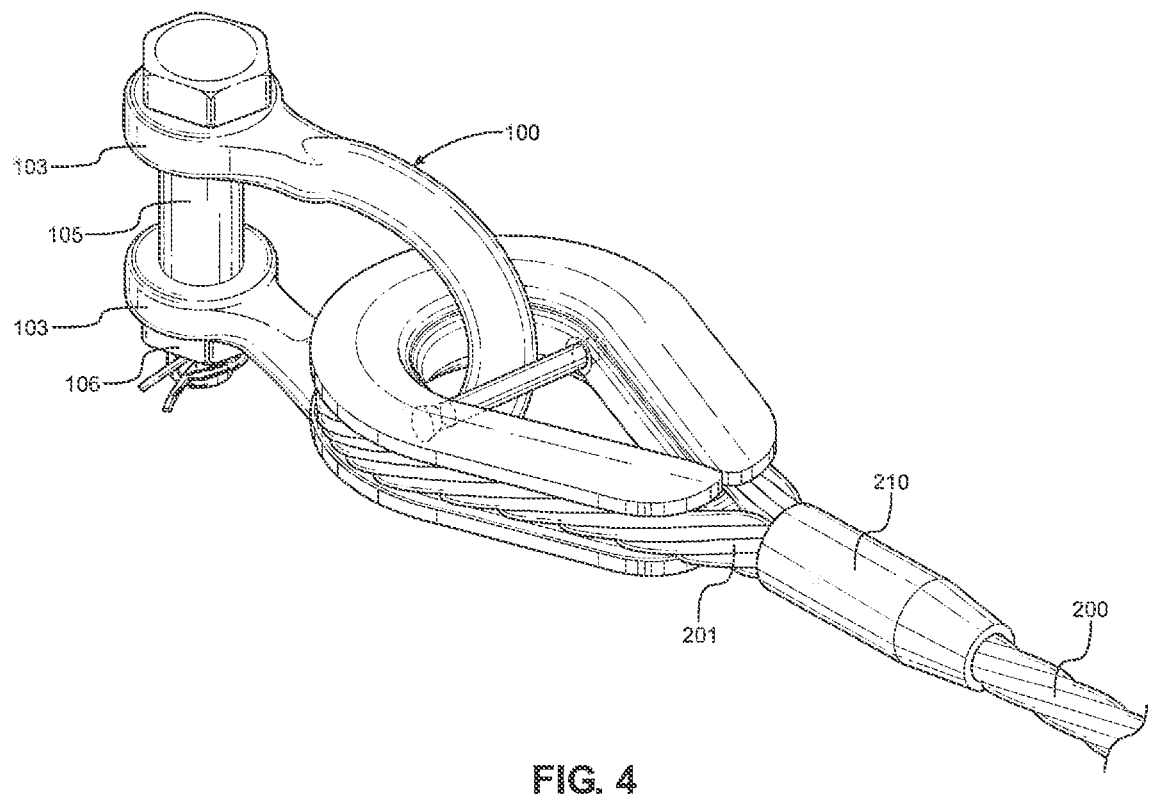
FIG. 4 depicts a perspective view of a thimble assembly of the present invention deployed on a sling apparatus with a shackle installed.

FIG. 4 depicts a perspective view of a thimble 10 of the present invention deployed within a loop 201 of a sling apparatus with a shackle assembly 100 installed. Said thimble 10 can be manufactured in virtually unlimited range of different sizes, to accommodate different sizes of wire rope 200 or other operational requirements. By way of illustration, but not limitation, said thimble 10 can be sized to accommodate wire rope with a diameter of approximately ⅝ inches or smaller, to approximately 3.5 inches or larger. Desired wire rope diameters can be designed for by simply modifying the dimensions of thimble 10 and other assembly components, as necessary.

In some embodiments, the depth and/or width of said outer peripheral channel 14 of said thimble 10 can be slightly larger than the diameter of loop 201 of wire rope 200 placed in said channel 14 of said thimble 10. In a preferred embodiment, said thimble 10 will typically range in length from approximately 2.5 inches to approximately 10 inches, and can range in width from approximately 2 inches to approximately 7.25 inches; of course, thimble 10 can be manufactured with larger or smaller dimensions, as desired.

Still referring to FIG. 4, prior to installation of thimble 10 within wire rope loop 201, a shackle member 100 is placed into eye 13 of thimble 10. In the embodiment depicted in FIG. 4, said shackle comprises substantially c-shaped shackle loop 101 having crown 102 and end lugs 103. Said end lugs 103 define aligned bores for receiving bolt 105 having bolt head aperture 107. As depicted in FIG. 4, bolt 105 is secured in place within said aligned bores of said end lugs 103 using threaded nut 106.

In a preferred embodiment, shackle member 100 is threaded through said eye 13 of thimble member 10. Thereafter, shackle retaining pin 30 is installed; said shackle retaining 30 forms a rigid element that extends between first leg 11 and second leg 12 of said thimble 10, crossing through said eyelet 13 of thimble 10. Once so installed, said shackle retaining pin 30 effectively reduces the size of the opening that said shackle lugs 103 can pass through, thereby blocking said shackle 100 in place and preventing said shackle 100 from being removed from said thimble eyelet 13.

Thereafter, still referring to FIG. 4, loop 201 of wire rope 200 is received in recessed channel 14 that extends along the outer peripheral surface of thimble 10. Loop 201 is formed in wire rope 200 and secured using ferrule 210 in a manner well known to those having skill in the art. For example, strands of wrapped wire rope 200 can be partially separated into first and second sections; said sections can be spliced together to form a loop 201 which is received within peripheral channel 14 of thimble 10. It is to be observed that, in the embodiment depicted in FIG. 4, thimble 10 is not easily detachable from loop 201 of wire rope 200. In this embodiment, thimble 10 is not a load-bearing device.

As depicted in FIG. 4, loop 201 generally conforms to curved shape thimble 10. Said thimble 10 can thus limit the degree to which wire rope loop 201 will be bent or pinched when force is applied to said rope loop 201 (e.g., when tension is applied to the rope), and adds protection and reinforcement to the inner surface of the wire rope loop 201, thereby preventing fraying and abrasion of said wire rope loop 201.

With wire rope loop 201 disposed within outer peripheral channel 14 of thimble 10, retaining pin 30 is tightly secured in aligned bores 21 and 22. In this configuration, retaining pin 30 cannot be removed or broken off of thimble 10 without some observable damage to thimble 10, wire rope loop 201 and/or retaining pin 30. In a preferred embodiment, one or both ends of retaining pin 30 can be attached or otherwise secured to the legs of thimble 10; by way of illustration, but not limitation, said ends of retaining pin 30 can be welded to said legs, secured to said legs using adhesive and/or attached to said legs using threaded connections. Thus, a torch or other cutting instrument would be required to remove retaining pin 30 from thimble 10.

Figure 5:
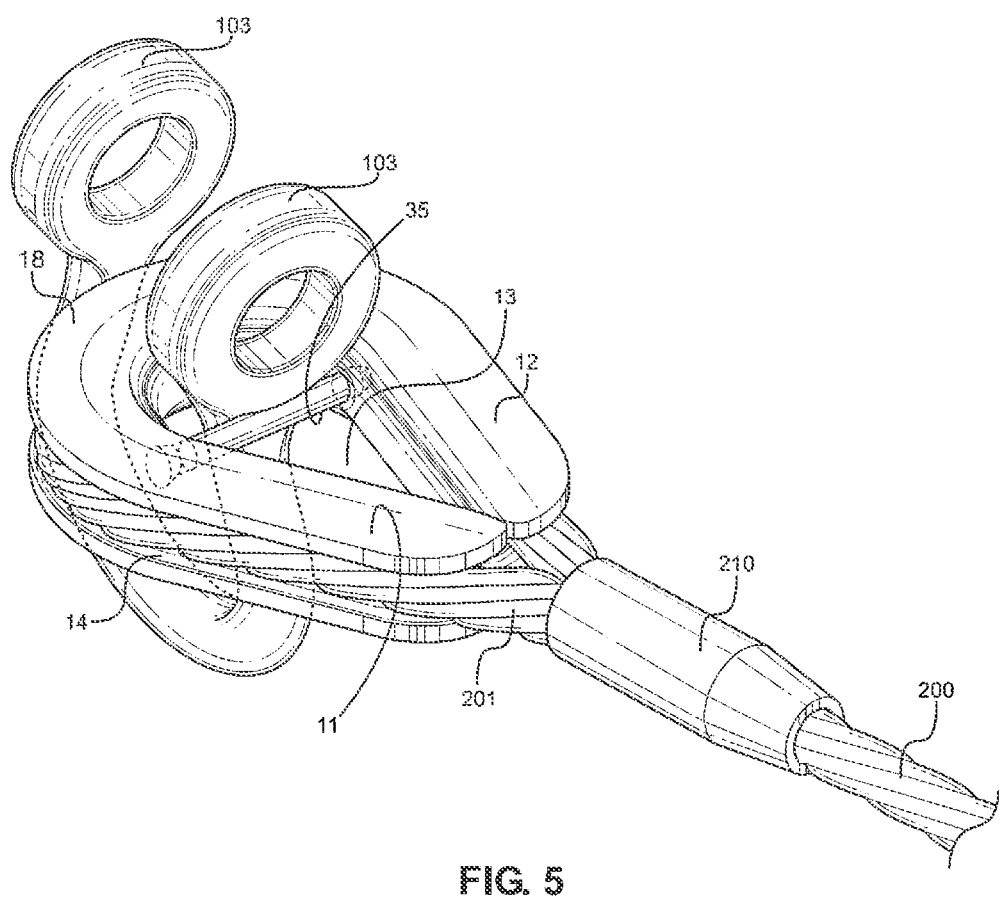
FIG. 5 depicts an alternative perspective view of a thimble assembly of the present invention deployed on a sling apparatus with a shackle installed.

FIG. 5 depicts an alternative perspective view of thimble 10 of the present invention deployed on a sling apparatus with a shackle member 100 installed. Components of the present invention are beneficially sized such that said shackle 100, once said shackle retaining pin 30 is installed, cannot be removed from thimble eyelet 13 without damage to shackle 100, thimble 10 and/or wire rope loop 201. In this configuration (that is, with a retaining pin 30 installed), said shackle retaining pin 30 (acting in cooperation with said thimble 10) does not permit removal of a properly sized shackle 100 or other rigging element simply by turning or rotating said shackle 100 at different angles. Note that any type of rigging element can be installed through thimble eye—for example, other types of shackles, including so-call "round pin" and "screw pin" shackles, can all be part of a captivated wire rope assembly according to the present invention.

At any point in the method, a wire rope can be separated into two halves, or groups of bundles, along at least part of its length. This can result in the wire rope branching into two halves, each half having an end. A shackle and thimble combination can be slid onto one of the half ends, such that one of the wire rope halves passes through the shackle opening, and the other wire rope half does not. The two halves of wire rope can then be crossed over one another (e.g., one half forms a right hand loop, and the other forms a left hand loop) and rewoven or twisted together to form a loop of wire rope over the shackle and thimble combination.

The wire rope loop can be placed into the outer peripheral groove of the thimble, and a ferrule or other hardware can be applied to secure the loose ends of the loop back onto the original wire rope. In some embodiments, the ferrule or sleeve has already been placed on the main body of the wire rope and just needs to be slid or knocked into a position suitable to secure the loop. For example, in one embodiment, cylindrical ferrules can be swaged around the peripheral surface of the wire rope in order to secure the loose ends back onto the original rope body and create a captivated construction.

The disclosed captivated wire rope assembly can allow manufacturers to provide the shackle or other rigging element as part of an assembly, or sling, and not allow shackle replacement or substitution in the field. In some embodiments, the wire rope cannot be removed from the thimble placed into the thimble peripheral groove, without damaging the rope itself or other components of the captivated wire rope assembly. In some embodiments, once the wire rope has been spliced and clamped, such as with a ferrule, the rope cannot be removed from the thimble without visible damage to the rope, thimble and/or assembly components. This can further ensure that users will not separate the components of the captivated wire rope assembly, thus allowing manufacturers to trace entire assemblies instead of dealing with individual components.

The disclosed captivated wire rope assembly can also allow more flexibility in the size of shackle placed on by the manufacturer. Some conventional reinforced thimbles are provided with a bar welded to both legs of the thimble. A custom thimble would be required if the user needed a larger than typical shackle for a particular rope or thimble size. The captivated wire rope sling of the present disclosure allows more flexibility, in that a larger shackle can be provided by the manufacturer without requiring any change or custom modification to the thimble or other components of the captivated sling assembly.

In a preferred embodiment, the present invention allows a manufacturer or other provider to obtain regulatory certification for a single wire rope sling assembly, including shackle(s) and other components, rather than being required to obtain multiple regulatory certifications for several different individual components (that must subsequently be combined or assembled in order to form a complete sling assembly). By permitting regulatory certification for a single wire rope sling assembly, the overall number of regulatory certifications is reduced, thereby resulting in savings of time, money and labor, while permitting complete traceability of sling assemblies and components In alternate embodiments, a retaining member (such as retaining pin 30) can be secured to a thimble using different attachment means without departing from the scope of the present invention. For example, said retaining member can be releasably secured to a thimble, such as by a welded device to one leg of the thimble that can be bent or hammered out of the assembly. Alternatively, pins, screws, magnets or other releasable fasteners that are not permanently retained inside of the thimble assembly can be used to secure one end of a retaining member to a thimble, while a second side will be permanently connected to or integrally formed with the thimble. Said retaining member would only become detached from a thimble when a wire rope is removed from said thimble.

Retaining pin 30 can be provided with any suitable coatings, platings, engravings, pigments, or the like, to meet user requirements. In some embodiments, the retaining pin can include a bumper layer, such as a rubber bumper or encasement on some or all surfaces of the retaining pin. For example, in one embodiment, a retaining pin 30 can include a rubber bumper along elongated pin body section 35 extending through a thimble eye.

Furthermore, it is to be observed that the retention assembly of the present assembly can be selectively provided on all, or less than all, ends of a sling assembly. For example, when the retention assembly of the present invention is used on one loop or end of sling assembly having multiple loops, any termination can be used for the other loop(s) of the sling. By way of illustration, but not limitation, a wire rope sling having two ends can be provided with the retention assembly of the present invention on one of said ends, and a standard eye, conventional thimble, open or closed swage socket, hook, slip-thru thimble, crescent thimble, or other device on the other end.

While retaining pin 30 is depicted in the appended figures as having a substantially semi-cylindrical configuration and a substantially round cross sectional shape, it is to be observed that said retaining member can have other shapes and/or embodiments without departing from the scope of this invention. For example, said retaining members can be substantially square, rectangular, circular, oval, trapezoidal, planar (flat) or diamond shaped; in such cases, bores or apertures extending through thimble leg members can match said retaining member geometry. Similarly, thimble 10 can be provided with multiple retaining members. For example, in an alternative embodiment, multiple retaining members— each with only one side secured to one leg of the thimble, is provided.

In a preferred embodiment, eye loop 13 of thimble member 10 should provide enough room or clearance for a shackle to be removed from thimble member 10 when retaining pin 30 is not installed. In this manner, several different sizes of shackles can be installed within thimble member 10 (prior to installation of retaining pin 30) without requiring any design changes to said thimble member 10. With conventional wire rope thimbles, if a user requires a different shackle than is customarily provided with a particular thimble size, a different thimble generally must be manufactured specifically to accommodate the different shackle. Thus, the retention assembly of the present invention allows for more flexibility, as more than one size of shackle or other rigging element can be utilized in connection with a particular thimble member 10.

Unlike conventional shackle assemblies, the method and apparatus of the present invention requires no bending of thimble members or welding of thimble members with wire rope installed. As a result, changes or alterations to such thimble members caused by such bending or welding are eliminated. This insures that a wire rope will fit a thimble member as originally designed. Further, there is no weakening or alteration of strength or metallic properties of the thimble due to bending. Further, excessive heat caused by welding will not impact the strength of wire rope; because a retaining pin of the present invention can be welded to a thimble member before installation of such wire rope, the integrity of the wire rope is preserved.

Conventional reinforced thimbles with pieces welded on both thimble legs have further disadvantages as well. For example, suitable shackle sizes are limited for each thimble, because the shackle must be placed on after welding, and therefore it has to fit through the thimble eye. Thus, the shackle would be removable and replaceable in the field, destroying the integrity of the assembly. Such a removable shackle is not traceable with the rest of the assembly, and would require additional safety certifications for each assembly component.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A method for permanently retaining a separate component to a wire rope shackle assembly comprising:
    a) providing a u-shaped thimble member comprising:
        i) a first leg portion having a first end, a second end and a first transverse bore extending through said first leg portion;
        ii) a second leg portion having a first end, a second end and a second transverse bore extending through said second leg portion;
        iii) an arch portion connecting said first end of said first leg portion to said first end of said second leg portion, wherein said first leg portion, said second leg portion, and said arch portion define a thimble eye, and wherein said second ends of said first and second leg portions are not attached to each other;
        iv) an outer peripheral groove having a length, wherein said outer peripheral groove is disposed along the outer surface of said first leg portion, second leg portion and said arch portion, and defines a recessed surface configured to receive a wire rope;
    b) partially installing said separate component in said thimble eye;
    c) installing a rigid retaining member through said first and second transverse bores, wherein said rigid retaining member extends from said first leg portion to said second leg portion and spans said thimble eye, and wherein said rigid retaining member is countersunk in said first and second transverse bores and no portion of said rigid retaining member extends into said outer peripheral groove; and
    d) installing wire rope around said thimble member in said outer peripheral groove, wherein said wire rope contacts said recessed surface along said length of said outer peripheral groove, but no portion of said wire rope contacts said countersunk rigid retaining member.

2. The method of claim 1, wherein the rigid retaining member is permanently affixed to said first and second leg portions.

3. The method of claim 1, wherein said first and second bores are aligned with each other.

4. The method of claim 1, wherein said separate component comprises a shackle.

5. A method for permanently retaining a shackle to a wire rope shackle assembly comprising:
    a) providing a u-shaped thimble member comprising:
        i) a first leg portion having a first end, a second end and a first transverse bore extending through said first leg portion;
        ii) a second leg portion having a first end, a second end and a second transverse bore extending through said second leg portion;
        iii) an arch portion connecting said first end of said first leg portion to said first end of said second leg portion, wherein said first leg portion, said second leg portion, and said arch portion define a thimble eye, and wherein said second ends of said first and second leg portions are not attached to each other;
        iv) an outer peripheral groove having a length, wherein said outer peripheral groove is disposed along the outer surface of said first leg portion, second leg portion and said arch portion, and defines a recessed surface configured to receive a wire rope;
    b) partially installing said shackle in said thimble eye;
    c) providing a rigid retaining member having a first end, a second end, and a first head disposed at said first end;
    d) installing a rigid retaining member through said first and second transverse bores, wherein said rigid retaining member extends from said first leg portion to said second leg portion and spans said thimble eye, and said first head is countersunk in said first leg portion and does not extend into said outer peripheral channel;

e) installing a second head on said second end of said rigid retaining member, wherein said second head is countersunk in said second leg portion and does not extend into said outer peripheral channel; and f) installing wire rope around said thimble member in said outer peripheral groove, wherein said wire rope contacts said recessed surface along said length of said outer peripheral groove, but no portion of said wire rope contacts said rigid retaining member, said first head or said second head.

* * * * *